Figure 1:
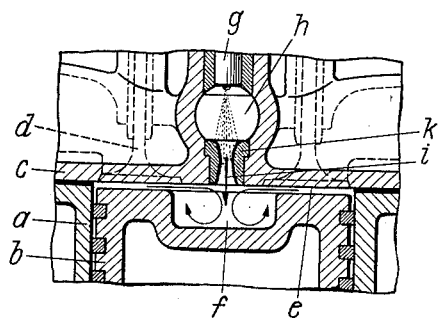

Dec. 23, 1952   F. K. H. NALLINGER   2,622,570
DIESEL ENGINE WITH PRECOMBUSTION CHAMBER
Filed March 10, 1950

INVENTOR
FRIEDRICH K. H. NALLINGER
By: Haseltine, Lake & Co.
AGENTS

Patented Dec. 23, 1952

2,622,570

UNITED STATES PATENT OFFICE 2,622,570

DIESEL ENGINE WITH PRECOMBUSTION CHAMBER

Friedrich K. H. Nallinger, Stuttgart, Germany, assignor to Daimler-Benz Aktiengesellschaft, Stuttgart-Unterturkheim, Germany Application March 10, 1950, Serial No. 148,858
In Germany March 15, 1949

14 Claims. (Cl. 123—32)

Object of this invention is a diesel engine with precombustion chamber. Its particular purpose is an improved method for the operation of same. Diesel engines with precombustion chambers are essentially operated by having the fuel injected into the precombustion chamber and the contents of the latter blowing out of it due to the increase in pressure resulting from the partial combustion, into the main combustion chamber where it is burned up, the combustion process being acompanied by a power delivery to the piston. The most favorable results from the viewpoints of fuel consumption and output are herein obtained by distributing the contents of the precombustion chamber directed into the main combustion chamber as uniformly as possible within the air compressed in the main combustion chamber, in other words by involving the whole of the air charge for the mixture formation, thus permitting to obtain as complete and quick a combustion process as possible.

An essential feature of this invention will accordingly consist in that the air compressed in the cylinder will be forced, at the end of the compression stroke, from the outside sections of the combustion chamber to the inside toward the outlet of the precombustion chamber, where it will be diverted to a cavity provided in the piston head. Precombustion chamber and cavity are therefore arranged in such a way relatively to one another that the jet will blow out of the precombustion chamber at, or approximately at, the point of impact of the radial air streams entirely or partly in direction of their diversion to the piston head, thus being carried along by the displaced air into the piston cavity. The ring-shaped, i. e. annular swirls coming into existence over the bottom of the piston cavity will result in an effective and intimate mingling of the air with the fuel and combustion gases. This mingling action will moreover be particularly intensified by the fact that the flat top of the piston approaches as close as possible to the cylinder head which will result on the one hand in the production of a sharp radial stream flowing in direction of the outlet of the precombustion chamber, and on the other hand in the displacement of the main part of the air compressed in the cylinder into the piston cavity. To render starting operation easier, a portion of the fuel can suitably be injected through the precombustion chamber directly into the piston cavity, i. e. into the hottest parts of the combustion chamber. This may be done at starting R. P. M. or, if required or suitable, even when the engine is in normal operation. The result will be that such an engine will present the properties of an engine with precombustion chamber as well as those of an engine operating according to the direct injection method.

According to the invention, the connection between the precombustion chamber and the main combustion chamber, i. e. the outlet of the precombustion chamber can be provided to be vertical or inclined by a determined angle to the piston top. In the latter case the outlet would run obliquely into the piston cavity. In the case of a central, or essentially central, arrangement of the precombustion chamber relatively to the axis of the cylinder (e. g. between four valves provided on the cylinder head) also the piston cavity will be provided in a central, or essentially central, arrangement with respect to the outlet of the precombustion chamber. In the case, however, of the position of the precombustion chamber being eccentric (e. g. next by the valves), the piston cavity and the outlet of the precombustion chamber will suitably be shifted relative to one another in conformity to the unsymmetrical streams of the air displaced. In the event the precombustion chamber, i. e. the outlet of the precombustion chamber is inclined, also the axis of the piston cavity can correspondingly be oblique. The piston cavity may be given any shape which might fit the stream. It can be e. g. bell-mouthed toward the cylinder space.

The operating method, object of this invention, will offer the advantage that the jet coming from the precombustion chamber will be permitted, after leaving the precombustion chamber, to expand freely, and to diffuse uniformly within the air which is forced into the piston cavity and swirling in same.

This air movement is moreover intensified due to the fact that the direction of flow of the jet blowing from the precombustion chamber is the same. Combustion and consumption are thereby favorably influenced. At the same time, a direct impact of the hot jet blowing out of the precombustion chamber onto the piston head is avoided, thus preventing a particularly heavy local thermic stressing of the piston. A non-throttled connection between the piston cavity and the cylinder space will moreover improve the output of the engine.

Figs. 1 to 4 in the drawing show diagrammatically four examples of embodiment of the invention.

Piston $b$ is sliding in the cylinder $a$ of an engine, e. g. a 4-stroke diesel engine. Piston $b$ approaches, when reaching the upper dead point, as close as possible the cylinder head c—which is e. g. water-cooled—with the valves d, thus forcing (as indicated by the arrows) the air existing over the outside peripherical sections of the piston from the narrow slot e radially in inward direction into piston cavity f. The latter will herein suitably take up the main portion of the combustion air in the upper dead point of the piston. The fuel is injected through a nozzle g into a precombustion chamber h, where it is partly burned, so that the contents of the precombustion chamber will blow out of the precombustion chamber, due to the increase in pressure taking place in the precombustion chamber, through a connection or over-flow channel i—arranged e. g. in an insertion piece k—into piston cavity f (in the direction indicated by the center arrow). Precombustion chamber and piston cavity are herein so arranged relative to one another that the contents of the precombustion chamber will blow into the meeting air streams. This will occur in direction of their diverted stream flows with the result that the above mentioned contents of the precombustion chamber will be diffused by the air within the piston cavity.

Injection nozzle g and e. g. the nozzle-like connection channel i will moreover be centered to one another along the same axis so that if the injection pressure is sufficient—particularly at low R. P. M. and when engine is started—the fuel will pass through the precombustion chamber and reach the piston cavity and hence (especially when starting) the hottest sections of the main combustion chamber, wherein it will cause the initial ignition to take place.

To obtain a particularly sharp air stream in direction of the outlet of the precombustion chamber, piston cavity f, may be sharply or relatively sharply cut off against the circumferential section of the piston.

In Fig. 1, the e. g. spherical, precombustion chamber h, and correspondingly also the piston cavity f, are arranged centrically along the axis of the cylinder of the engine. An e. g. nozzle-like connection or overflow channel runs from the precombustion chamber into the main combustion chamber or the cavity, respectively.

Figure 2:
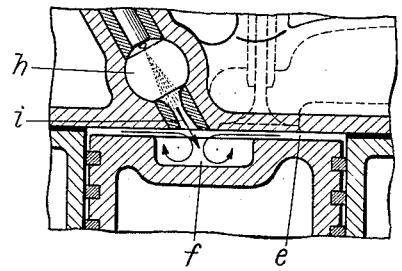

In Fig. 2, the precombustion chamber (which is e. g. placed laterally near the valves in the water-cooled cylinder head) is arranged eccentrically and obliquely to the cylinder axis. Piston cavity f is also in this case shifted relatively to the cylinder axis. Due to the fact that, owing to this arrangement, there will be air streams produced which are unsymmetrical relatively to the axis of the piston cavity, the connection channel will suitably run from the precombustion chamber into the piston cavity eccentrically and in a way fitting the air streams meeting outside the center of the piston cavity.

Figure 3:
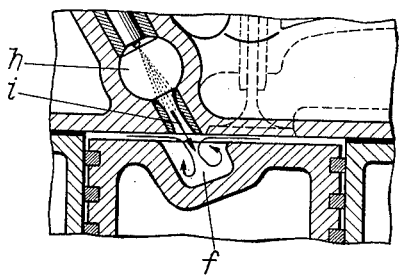

In Fig. 3, piston cavity f is also inclined in a way corresponding to the oblique arrangement of precombustion chamber h: the axes of precombustion chamber and piston cavity will essentially coincide. They may also be shifted relatively to one another taking into account the unsymmetrical streaming conditions. Contrary to the examples of embodiment according to Figs. 1 and 2, the depth of cavity f is in this case larger than the diameter, thus giving the jet blowing from the precombustion chamber into the cavity a particularly great freedom of expansion.

Figure 4:
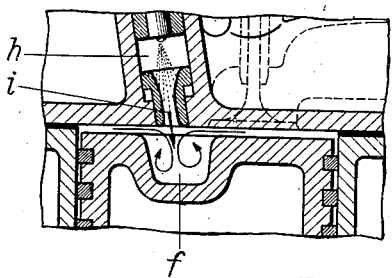

In example of embodiment according to Fig. 4, the piston cavity is somewhat bell-mouthed to the cylinder space. The outlet of the precombustion chamber will run, in a way corresponding to the eccentrical arrangement relatively to the cylinder axis, in a somewhat eccentrical arrangement to the axis of the piston cavity into the latter.

The engine may be a 2-stroke or a 4-stroke engine and can be used for any purpose desired, particularly as a high speed vehicle diesel engine. The precombustion chamber can be cast integral with the cylinder head or be inserted in the latter.

The invention is not restricted to the examples of embodiment outlined in the foregoing.

The precombustion chamber can essentially be designed in any suitable way and be in connection with the cylinder space through one or several openings, and discharge through it, or them, into the piston cavity. The passage section of the connection channel may also be subdivided into several channels which may unite again into a common outlet before reaching the piston cavity.

What I claim is:

1. Diesel engine with precombustion chamber comprising a sliding piston, the top of which is provided with a cavity constituting essentially the main combustion chamber and surrounded by a piston edge; a precombustion chamber and a connection channel between the precombustion chamber and the main combustion chamber, said channel having a mouth freely opening into the main combustion chamber in a plane not lower than the plane formed by the piston edge in the top dead centre position of the piston in such a way that the contents of the precombustion chamber will essentially blow into the center axis of the annular swirls produced by the air streams which are directed from the piston edge to the inside and diverted into the piston cavity.

2. Diesel engine with precombustion chamber according to claim 1, wherein the stroke of the piston is so calculated that when reaching the upper dead point, the edge of the piston comes close to the upper terminal walling of the cylinder space.

3. Diesel engine with precombustion chamber according to claim 1, wherein the precombustion chamber and the connection channel are arranged approximately in the axis of the cylinder, and the connection channel runs approximately into the center of the piston cavity, its direction being essentially perpendicular to the piston top.

4. Diesel engine with precombustion chamber according to claim 1, wherein the connection channel running into the piston cavity is arranged eccentrically to the cylinder axis, and the piston cavity is in eccentrical arrangement to the cylinder axis as well.

5. Diesel engine with precombustion chamber according to claim 1, wherein the connection channel is inclined to the top of the piston and runs into the piston cavity, in such an eccentrical arrangement relatively to the axis of the piston cavity, that the axis of the unsymmetrical annular air swirls produced in the piston cavity due to the unsymmetrical displacing action of the piston will essentially coincide with the axis of the connection channel.

6. Diesel engine with precombustion chamber according to claim 1, wherein the axis of the connection channel, as well as the axis of the piston cavity, are inclined to the top of the piston.

7. Diesel engine according to claim 1, wherein the axis of the connection channel as well as the axis of the piston cavity are arranged in oblique direction to the top of the piston and are reciprocally shifted in such a way that the axis of the connection channel will essentially coincide with the axis of the unsymmetrical ring-shaped swirls produced in the piston cavity.

8. Diesel engine with precombustion chamber according to claim 1, wherein the piston cavity is in a non-throttled connection with the cylinder space.

9. Diesel engine with precombustion chamber according to claim 1, wherein the piston cavity is bell-mouthed to the cylinder space.

10. Diesel engine with precombustion chamber according to claim 1 in conjuction with an injection nozzle, the latter being so arranged that the fuel can be injected following a straight line from the nozzle through the connection channel into the main combustion chamber.

11. In a combustion engine, a cylinder housing with a cylinder space, a cylinder head, at least one valve in the cylinder head, a precombustion chamber arranged eccentrically and obliquely to the axis of the cylinder and essentially opposite to the valve, a channel connecting the precombustion chamber to the cylinder space and a cavity provided in the top of the piston which is also arranged eccentrically to the axis of the cylinder on the side of the precombustion chamber, in such a way that the axis of the unsymmetrical annular swirls produced in the piston cavity will essentially coincide with the axis of the connection channel.

12. Diesel engine with precombustion chamber according to claim 1, wherein the connection channel will essentially end in the plane of the upper terminal walling of the cylinder space.

13. Diesel engine with precombustion chamber according to claim 11, wherein the connection channel will essentially end in the plane of the lower part of the cylinder head constituting the upper terminal walling of the cylinder space.

14. Diesel engine with precombustion chamber according to claim 1, wherein the connection channel is arranged in an insertion piece inserted in the housing of the engine.

FRIEDRICH K. H. NALLINGER.

REFERENCES CITED

The following references are of record in the file of this patent:

UNITED STATES PATENTS

| Number | Name | Date |
|---|---|---|
| 1,648,647 | Krettingen | Nov. 8, 1927 |
| 2,171,912 | Boxan | Sept. 5, 1939 |

FOREIGN PATENTS

| Number | Country | Date |
|---|---|---|
| 586,231 | Germany | Oct. 18, 1933 |

OTHER REFERENCES

Serial No. 368,293, Von Mallinckrodt (A. P. C.), published May 11, 1943.